United States Patent [19]
Piasecki et al.

[11] Patent Number: 5,111,451
[45] Date of Patent: May 5, 1992

[54] METHOD AND APPARATUS FOR SYNCHRONIZING AN OPTICAL TRANSCEIVER OVER A FULL DUPLEX DATA COMMUNICATION CHANNEL

[75] Inventors: Douglas S. Piasecki, Austin; Eric J. Swanson, Buda, both of Tex.; Russell A. Hershbarger, Nevada City, Calif.

[73] Assignee: Crystal Semiconductor, Austin, Tex.

[21] Appl. No.: 429,213

[22] Filed: Oct. 27, 1989

[51] Int. Cl.⁵ ............................................. H04J 14/08
[52] U.S. Cl. .................................... 370/29; 370/94.1; 370/103
[58] Field of Search ................. 370/29, 32, 100.1, 103, 370/105.1, 108, 94.1

[56] References Cited
U.S. PATENT DOCUMENTS

4,606,023 8/1986 Dragoo ............................... 370/103
4,720,827 1/1988 Kanaji .................................. 370/29

Primary Examiner—Benedict V. Safourek
Assistant Examiner—Melvin Marcelo
Attorney, Agent, or Firm—Ross, Howison, Clapp & Korn

[57] ABSTRACT

An optical communication system includes two optical modems (12) and (14) which are disposed at either end of an optical fiber data link (10). The optical modems (12) and (14) communicate through LEDs (16) and (18), respectively, with the fiber data link (10). Each of the optical modems (12) and (14) on start-up are peerless and do not operate in either a master or a slave configuration. A ping-pong transmission format is utilized with transmitted packets of data. When one of the optical modems (12) or (14) detects a transmitted packet from the other, it locks up to the transmitted packet with a phase lock loop and takes on slave status. This slave status is transmitted back to the fiber data link (10) in another transmitted packet. The transmitted packet from the slave device is then adjusted time relative to the machine cycle of the slave device until the packet is received by the other optical modem. Once the other optical modem receives the transmitted packet from the slave optical modem, it recognizes this fact and takes on a master status. This master status is transmitted back to the slave optical modem and adjustment of the relative position of the transmitted packet therein is terminated and the start-up procedure is terminated.

3 Claims, 6 Drawing Sheets

| SYSTEM CLOCKS | | | | | | | | | | | |
|---|---|---|---|---|---|---|---|---|---|---|---|
| 4 | 4 | 4 | 4 | 32 | 1←31 | 4 | 4 | 4 | 32 | 31→1 | 4 |
| ST1 | ST2 | ST3 | ST4 | ST5 | ST6 | ST7 | ST8 | ST9 | ST10 | ST11 | ST12 |
| RX PRE-AMBLE | RX CTL WD #1 | RX CTL WD #2 | ←RX | DATA→ | VAR XMIT TIME | XMIT PRE | XMIT CTL WD #1 | XMIT CTL WD #2 | XMIT T_FIF DATE | VAR RX TIME | TX/RX TURN |

RX FRAME / TX FRAME

METHOD AND APPARATUS FOR SYNCHRONIZING AN OPTICAL TRANSCEIVER OVER A FULL DUPLEX DATA COMMUNICATION CHANNEL

TECHNICAL FIELD OF THE INVENTION

The present invention pertains in general to full duplex transmission between two transceivers and, more particularly, to the synchronizing of the two transceivers over a single full duplex channel.

BACKGROUND OF THE INVENTION

Transceivers are in general utilized to effect a bi-directional communication path between two remote points over a communication channel. The transmission path or line provides the media for the data exchange between these two remote points or stations. This exchange typically includes session establishment, user messages and session termination, where a session is defined as the communication flow between two nodes and a network. The transmission path of the network can take many forms. The path can be a point-to-point or a multi-point configuration utilizing a simplex, half-duplex or duplex transmission format. The transmission format is a way in which message traffic flows across the transmission path.

In simplex transmission, provision is made only for unidirectional transmission. The sender cannot receive and the receiver cannot send. By comparison, half-duplex transmission provides movement of data across the line in both directions, but in only one direction at a time. Typically, a message sent to one terminal requires deciphering of the message, entering of the appropriate response and sending the reply, i.e. handshaking. The users on either end of the line take turns utilizing the line. Duplex transmission (also referred to as full-duplex) provides for simultaneous two-way transmission between the two stations. A duplex transmission permits the interleaving of sessions and user data flow among several or many stations.

In most transceiver systems utilized for communicating between two remote points, full-duplex transmission is generally required. One type of system providing for this type of transmission is that utilizing a universal digital-loop transceiver, manufactured by Motorola, Part No. MC-145422 and 145426. In this type of system, a single twisting pair cable is provided which may be up to two kilometers in length. These transceivers are primarily designated for use in digital subscriber voice/-data telephone systems or in remote data acquisition and control systems. These systems utilize a "ping-pong" data transmission scheme wherein one station acts as a master and one station acts as a slave with both stations having an operating cycle comprised of a transmission frame and a receive frame. Synchronization of the operating cycles is necessary to allow the master to transmit during the receive portion of the slave operating cycle, and likewise, transmission occurs between the slave and master during the receive frame of the master operating cycle. In this manner, transmission of data from the master to the slave does not collide with the transmission from the slave to the master.

There are a number of problems associated with initial synchronization of most transceiver systems. It can be appreciated that once the systems are synchronized, transmission can be effected in accordance with the "ping-pong" transmission scheme. However, when the two transceivers are not synchronized, two transmissions can occur at the same time over the communication channel. Since a separate clock is not transmitted between the two transceivers, the local receiver clock or time base must be synchronized with the received data. However, this necessitates one of the two transceivers being designated a master and one being designated a slave. Ordinarily, the transceiver circuitry of the prior art makes provisions for predesignation of one side of the transmission path as a master and one side as a slave.

A further problem that exists with some transceiver systems is accommodating transmission delay. When the slave side of the transmission system receives transmitted data and locks thereto during a receive frame, it is important that transmitted data from the slave arrive at the master during the receive frame. This synchronization can be effected by ensuring that there is a relatively long delay provided between transmission and reception frames in either the master or the slave, but this method can be uneconomical from a time and speed standpoint. Time and speed become especially critical when utilizing optical systems that are operable to transmit over a long haul data line. The disadvantages with the above systems arise from the fact that the master/slave designation requires two separate chips or provision for external selection therefore, as well as the need for schemes to accommodate the transmission delay.

SUMMARY OF THE INVENTION

The present invention disclosed and claimed herein comprises a method and apparatus for duplex transmission of digital data over a data link. Modems are provided at either end of the data link with each modem operable to transmit data and receive data in sequentially generated operating cycles. Each operating cycle includes a transmit frame during which transmitted data is encoded and transmitted to the data link, and a receive frame during which data is received from the data link and decoded. The operating cycles of the two modems are synchronized with each other to allow data to be subsequently transmitted therebetween in a ping-pong fashion. Each of the modems has a variable time source associated therewith. During synchronization, the first of the modems to receive data from the data link, phase locks the associated time source to the received data. This first modem is then designated as the slave modem. The slave status of the slave modem is then transmitted to the other modem and the other modem is designated as the master.

In another aspect of the present invention, each of the modems has a receive system clock generator and a transmit system clock generator. Prior to synchronization, both modems are peerless. When the first to receive modem receives data, the receive system clock is locked to the data rate of the received data. The slave modem then takes on its slave status and locks the transmit system clock to the receive system clock. The transmitted data from the slave modem to the master modem results in the phase locking of the receive system clock in the master modem to the transmit system clock in the slave modem, the receive system clock and the transmit system clock in the master modem being phase independent within the master modem.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
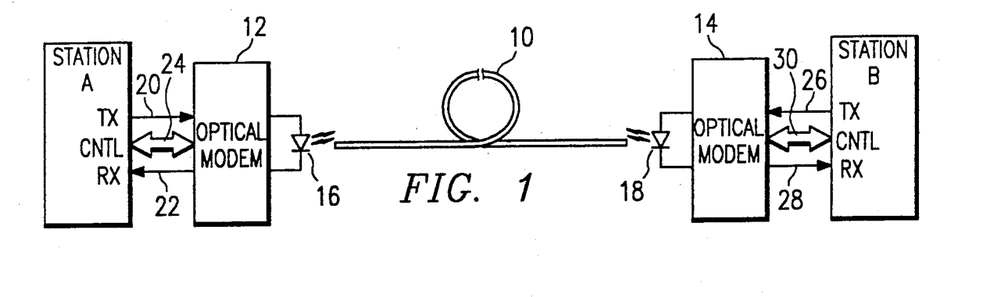
FIG. 1, illustrates a system block diagram of the present invention.

Referring now to FIG. 1, there is illustrated a system diagram utilizing the optical modems of the present invention. The transmission system utilized is a full-duplex system that allows two-way transmission between two remote stations. These stations are defined as a Station A and a Station B. Station A and Station B communicate over a single optical fiber 10 that may be of any given practical length. An optical modem 12 is provided for interfacing between Station A and one end of the optical fiber 10. An optical modem 14 is provided for interfacing between the other end of the optical fiber 10 and Station B. The optical modem 12 communicates with the one end of the optical fiber 10 through a light emitting/detecting diode (LED) 16 and, similarly, the optical modem 14 interfaces with the other end of the optical fiber 10 through an LED 18. The optical modems 12 and 14 are operable to receive digital data for transmission to the optical fiber 10 and convert received information from the optical fiber 10 to digital data. During transmission, each of the optical modems 12 and 14 convert a digital signal from a voltage to a current, which current is transformed into light modulation via LED 16/18 during transmission. Similarly, during reception of information from the optical fiber 10, light information is transformed into a current by the respective one of the LEDs 16 and 18 and converted to a digital signal by the respective modem 12 or 14.

The optical modem 12 receives digital transmit data from Station A through a communications line 20 and transmits received information to Station A over a communication line 22. Control signals are interfaced between the optical modem 12 and Station A through a control bus 24. In a similar manner, optical modem 14 receives digital transmit data from Station B over a communication line 26 and transfers received digital data to Station B over a communication line 28. Control signals are transferred therebetween over a control bus 30.

As will be described hereinbelow, transmission over the optical fiber 10 is effected by a "ping-pong" format. In this transmission format, a packet of transmitted information is transmitted from optical modem 12 to optical modem 14 during one frame and then a packet of information is transferred from optical modem 14 to optical modem 12 during a second and subsequent frame. Therefore, it can be appreciated that both optical modem 12 and optical modem 14 need to be synchronized. This synchronization is one of the important aspects of the present invention. In general, both optical modem 12 and optical modem 14 are identical and, therefore, during synchronization one of the optical modems 12 and 14 must be asserted as a master and one must be asserted as a slave. In this manner, the master can determine when the transmission frames for both optical modems 12 and 14 will be initiated. In addition, each of the optical modems 12 and 14 have a machine cycle which is comprised of a transmission frame during which a packet of information is assembled and transmitted, and a receive frame during which information is received and decoded.

Figure 2:
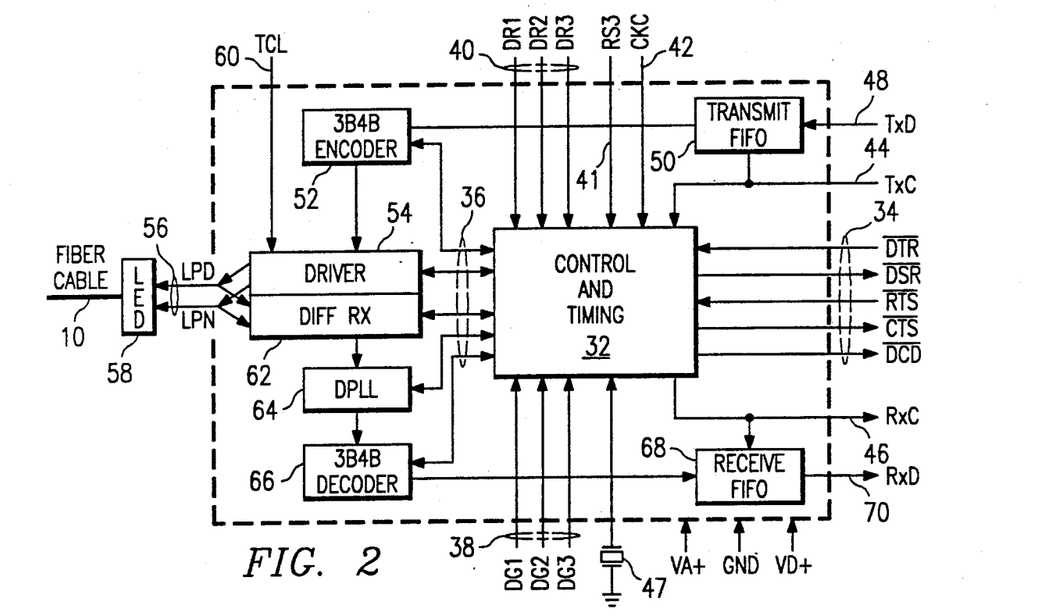
FIG. 2, illustrates a block diagram of a single transceiver.

Referring now to FIG. 2, there is illustrated a block diagram of each of the optical modems 12 and 14, both being identical. A central control and timing block 32 is provided, which block receives control signals on lines 34, which correspond to the buses 24 and 30, and outputs system control signals on lines 36 for generating internal control signals. Diagnostic inputs are provided on lines 38 and data rate control signals provided on lines 40. An input control RS2 is provided on line 41 for selecting whether the control signals on bus 30 are used in an end-to-end mode or in a modem control handshake mode. When line 41 is high, the modem control mode is selected. A clock control signal CKC is provided on line 42, which signal is operable to select either a user or chip supplied transmit clock for incoming data. The transmit clock signal $T \times C$ is provided on an input/output line 44 and a receive clock signal $R \times C$ is provided on an output line 46. In the continuous mode, the clock is output on the line 44, and in the synchronous mode, the clock is input thereon. The data rate control signals DR1, DR2, and DR3 on lines 40 determine the rate of the transmit clock signal on line 44. In the synchronous mode the received data is valid and stable on the rising edge of the $R \times C$ signal on line 46, the signal going into a high impedance state when asynchronous operation is selected.

In the asynchronous mode, data is accepted on line 48 and input to the transmit FIFO 50, which data is oversampled. This data is temporarily stored in the FIFO 50, encoded in encoder 52 and then transmitted to the far-end optical modem.

In the synchronous mode, data is accepted on line 48 and an external clock is accepted on line 44. The external clock is utilized to clock the Write Pointer of the FIFO 50. This data is stored in FIFO 50 and then encoded and transmitted down the optical fiber 10. In the encoding operation for the synchronous mode, the internal clock may differ somewhat from the external clock. Therefore, adjustments need to be made in assembling the transmitted packet, as will be described hereinbelow.

A crystal 47 is externally connected to the control and timing block 32 to provide a reference frequency. In the preferred embodiment, the system operates at 9.216 MHz.

The transmitted data on a line 48 is input to a transmit FIFO 50. The output of the FIFO 50 is connected to a 3B4B encoder 52, the output of which is connected to the input of a driver 54. The driver 54 converts the digital output of the encoder 52 into a current for output onto lines 56 and input to an LED 58. The current level of the driver 54 can be varied by an external control TCL on an input 60.

When the modem is enabled in the receive mode, the inputs on lines 56 are input to a differential receiver 62, which is comprised of a pre-amplifier, a linear channel and a comparator outputting a digital signal to a digital phase lock loop (DPLL) 64. The digital data is input to a 3B4B decoder 66. The output of the decoder 66 is input into a receive FIFO 68, the output of which provides the received data R×D on a pin 70.

In operation, a 3B4B line encoding is employed to ensure error-free transmission regardless of the one's density in the data to be transmitted. The 3B4B line encoding technique generates a four-bit binary code which corresponds to three binary input bits. This DC balanced code provides sufficient one's density to satisfy the requirements of the receiver's phase-lock loop while optimizing transmission bandwidth and reducing noise. At the receive end, the four-bit code is converted back to the original three bits before being output on the receive terminal 70.

In order to accomplish ping-pong communication, the near-end and far-end optical modems must first establish synchronization so that one of the optical modems operates in the slave mode, while its counterpart operates in the master mode. Each of the optical modems operates on an internal master system clock which operates at one-sixth of the crystal frequency. A machine cycle, which consists of 128 master clock cycles, is divided into four parts: a transmit frame, a variable delay period, a receive frame, and another variable delay period. The delay periods are established during synchronization to adjust the position of the transmit and receive windows to account for signal propagation time delays through the length of optical fiber that is utilized as well as operational differences between the modems themselves.

The optical modem attempts to establish synchronization upon power up or reset. In initial normal "peerless" operation, both optical modems attempt to communicate with each other utilizing a fixed code. The difference in crystal oscillator frequencies at either end will cause the transmit and receive windows of the two optical modems to drift with respect to each other, since no clock signal is transmitted therebetween. When one of the optical modems first recognizes a transmission from its counterpart, this first modem assumes the slave mode and changes its synchronization preamble to direct its counterpart to operate in the master mode. Once synchronized, the slave will then make small adjustments in the machine cycle to compensate for differences in oscillator frequencies of the oscillators of the two modems. The slave modem then adjusts the two variable delay periods to account for signal propagation time, as will be described in more detail hereinbelow.

In the receive mode, the LED 58 detects the data burst from the far-end optical modem and inputs this data to the DPLL 64. The DPLL 64 performs the timing recovery to maintain synchronization between the master and slave optical modems. The recovered signal is decoded and then stored in the receive FIFO 68.

When the optical modem powers up, the optical modems at either end initiate a ping-pong search. When synchronization is achieved by one of the optical modems receiving the transmitted packet and locking thereto, thus assuming the slave operation, the DCD signal indicating a digital carry detect is asserted in the transmitted data from the slave optical modem for transmission back to the optical modem on the other end of the optical fiber 10. Once in slave status, the optical modem then enables its DPLL 64 to align with the received packet from the other end of the optical fiber 10. Once the variable delay periods in the machine cycle for the slave optical modem are properly adjusted in the synchronization process, the other optical modem can receive optical data from the slave optical modem. Once this optical modem recognizes that the slave optical modem has asserted its DCD state, this optical modem then assumes the master status of link and asserts its DCD state. The slave optical modem then realizes that the master optical modem is synchronous, terminates the start-up procedure and maintains the variable delay periods at their current setting. If, for some reason, errors occur indicating that there is a lack of synchronization, the start-up procedure is again initiated to resynchronize the modes. Typically, the presence of two machine cycles out of four containing errors will indicate lack of synchronization.

Figure 3:
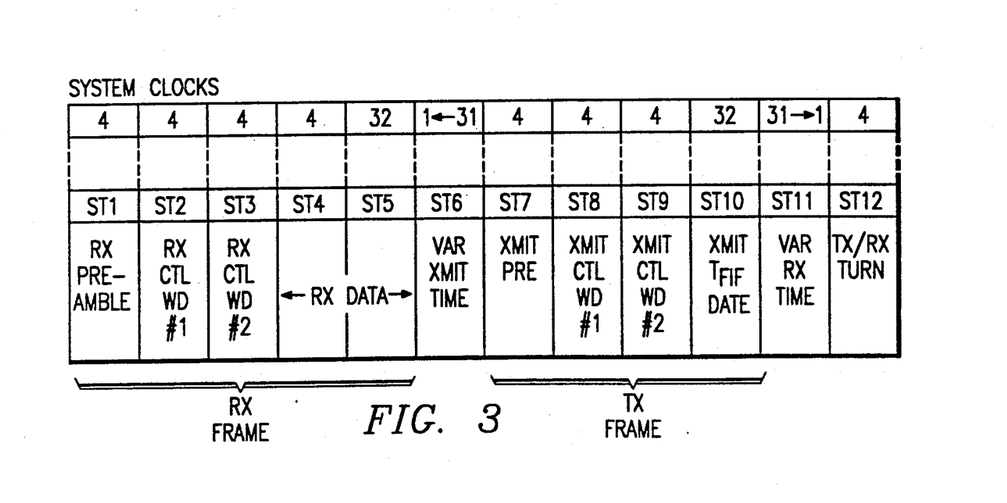
FIG. 3, illustrates the protocol for a receive frame and a transmission frame in a single machine cycle.

Referring now to FIG. 3, there is illustrated a diagram of the synchronization protocol for a given machine cycle. The machine cycle is divided up into a receive (Rx) frame and a transmit (Tx) frame with a variable transmit time dividing the receive frame and the transmit frame and a variable receive time attached to the machine cycle at the end of the transmit frame. The entire machine cycle may comprise, for example, 128 system clock cycles long. The machine cycle is divided up into 12 states, 5 states dedicated to the receive frame and 4 states dedicated to the transmitter frame. The states are labelled ST1–ST12 with the transmission packet of information represented by the transmit frame in states ST7–ST10. In the transmit packet, the first state is ST7, which comprises the transmit preamble. The states ST8 and ST9 comprise the first and second control words and ST10 comprises the transmitted data. The control words are each four clock cycles long and the transmitted data is 32 clock cycles long.

Transmission begins at ST7 and this transmission is launched onto the optical fiber 10 and takes an arbitrary amount of propagation time to reach the modem at the other end of the optical fiber 10, depending upon the characteristics of the cable, its length, etc. The propagation delay depends upon the optical fiber 10 and the speed of light in the optical fiber 10. Concurrently, the same transmission process is occurring at the opposite end of the optical fiber 10.

The preamble is a four-bit word and the control words each contain three status bits. The first control word contains two bits for asynchronous subchannels and a stuff indicator bit (SFI). The subchannel bits are defined as DT1 and DT2 which equal the binary sampled value of two near-end input pins DTR and DTS and are outputs DSR and CTS, respectively, of the far-end optical modem. The second control word contains the DCD bit and the RLB bit; the third bit in the second control word is not used. The RLB bit controls the remote loop-back test function, as will be described hereinbelow. The preamble in state ST7 uses one of the extra 3B4B codes to frame the optical modem receiver to the 3B4B coding. To properly receive the transmitted packet, the optical modem searches for a proper preamble and no 3B4B coding errors in the control words or data.

When data is received at the beginning of state ST1, the optical receiver processes the transmitted packet received from the optical fiber 10, examining the preamble, the control words, the data format and the timing. If the two optical modems are not synchronized, they will be treated as "peers", indicating that no master/slave decision has been made. The control words contain this peerless information, as will be described hereinbelow. If a master/slave decision has been determined, the data will then be received and decoded by the decoder 66 and input to the receive FIFO 68 for output therefrom. This will be followed by encoding of data to be transmitted by the 3B4B encoder 52 and then formation of a transmitted packet for transmission out to the optical fiber 10 on the next transmit frame.

Data is continually read into the optical modem transmit FIFO 50 and is systematically condensed to be transmitted in the transmit packet during the transmission frame. The effective time average data rate transmitted in the transmission packet must equal that of the incoming data. To set this rate the optical modem adjusts the data packet size according to the selected data rate. An "unstuffed" packet transmits a lower number of data bits than that required for the exact frequency. A "stuffed" packet transmits a higher number of data bits. The ratio of stuffed to unstuffed transmitted packets is controlled such that the average data rate is correct. The transmitter controls the data stuffing operation and will assert the stuff indicator bit (SFI) in the transmitted packet control word. The SFI bit is needed at the receiving end to control the number of received data bits. Table I lists the stuffed versus unstuffed control bits.

TABLE I

| DATA RATE (kHz) | UNSTUFFED | STUFFED | AVERAGE |
|---|---|---|---|
| 256 | 21 | 24 | 21.33 |
| 192 | 15 | 18 | 16 |
| 144 | 9 | 15 | 12 |
| 64 | 0 | 6 | 5.3 |
| 19.2 | 0 | 6 | 1.6 |
| 9.6 | 0 | 6 | .8 |
| 2.4 | 0 | 6 | .2 |

The optical modem machine cycle period equals approximately 83⅓ microseconds, thus the average column in Table I lists the averaged number of data bits per machine cycle. The ratio of the stuffed/unstuffed bits may be varied to account for differences in external and internal clock frequencies.

The transmitted packet of information must be formatted to provide the receiver with a sufficient number of data transitions. 3B4B formatting is utilized as described above, with the encoder 52 converting the data to be transmitted from three bits into four bits. This is a conventional encoding algorithm. The modem on the other end utilizes the decoder 66 to convert the data back to three bits and also uses the 4B extra codes in error detection.

In Table I, the maximum stuffed packet content is 24 uncoded data bits. Therefore, the transmitted packet must accommodate 32 coded bits. As an example, consider at a 2.4 kHz data rate, the unstuffed transmitted packet does not contain any transmit data bits (or it would violate the overall data rate average). The data portion of the transmitted package cannot be left empty because the receiver needs data transitions to maintain synchronization. In this case, the transmitter modem will not increment the transmit FIFO 50, and the constant FIFO output data bit will be encoded into the transmitted packet data space (which occupies 32 data bits). The receiver on the other end of the optical fiber 10 will thus receive sufficient data transitions. Since the control bit SFI is unasserted, the receiver ignores the data content.

Figure 4A:
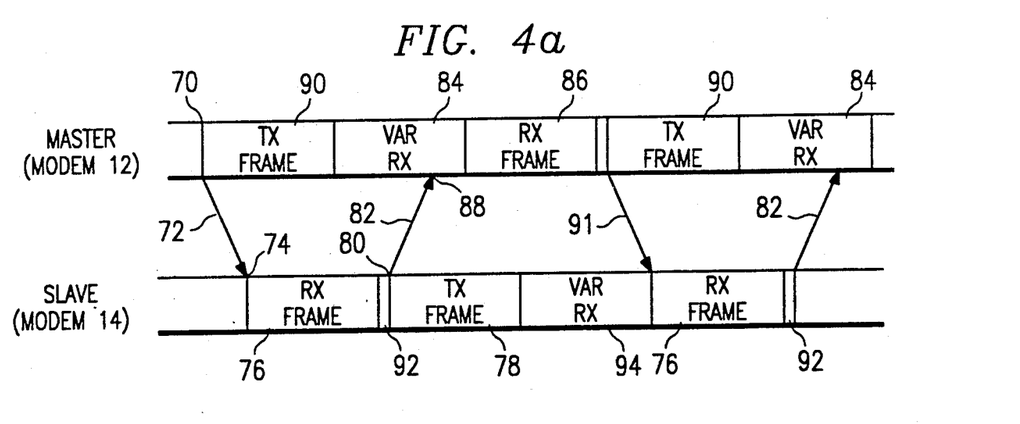
FIGS. 4a and 4b, illustrate the alignment of machine cycles during synchronization.
Figure 4B:
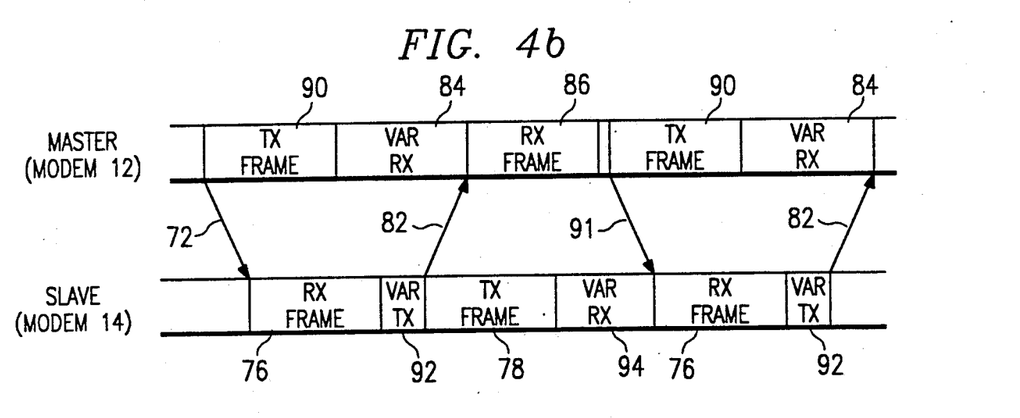

Referring now to FIGS. 4a and 4b, the synchronization operation will be discussed in more detail. In normal operation mode, when the master/slave status has been determined, the optical modems operate in a full duplex communication format. This format requires that the data transmission on a single fiber proceed in two directions, but not simultaneously. Therefore, the transmission frames must be synchronized in a communication line such that when the transmitted packet arrives at the slave optical modem, the leading edge of the receive frame is aligned therewith. In a similar manner, the transmitted packet from the slave to the master must be transmitted in such a manner that it arrives at the master at the leading edge of the receive frame therein. Therefore, for ping-pong communication to occur, the transmit and receive frames of the two optical modems must be properly synchronized such that during the receive mode of the master, the master will be "listening" for data from the slave in its transmit mode. During the transmit mode of the master, information will be transmitted to the slave, which is in its receive mode. Thus, each optical modem takes a turn transmitting data on the optical fiber in opposite directions.

Upon communication start-up, the system state of two optical modems 12 and 14 with reference to FIG. 1 is arbitrary; that is, they are equal peers in the communication system. For purposes of illustration, after synchronization, the optical modem 12 will be the master and the optical modem 14 will be the slave. Of course, this depends upon an arbitrary alignment and which of the optical modems 12 and 14 is first to receive a transmitted packet of data, which in this example will be optical modem 14.

In normal operation, the system states will drift apart due to frequency error between the crystal oscillators in the optical modems 12 and 14. Eventually, one of the optical modems 12 and 14 will receive data from the other of the optical modems 12 and 14 at the appropriate receive time period. Transmission is initiated at an edge 70 in the optical modem 12, which transmission is defined as the master transmission for the reasons described above. As described above with reference to FIG. 3, this transmission is the beginning of the state ST7 for the transmit preamble in the transmit frame. The transmission is launched onto the fiber 10 and takes an arbitrary amount of propagation time to reach the optical modem 14. This propagation time depends upon the length of the fiber cable and the speed of light in the cable, as described above.

In FIG. 4a, the receive frame for the optical modem 14 is shown in the proper state synchronization to receive the transmission from optical modem 12, which transmission is illustrated by an arrow 72, the leading edge of the receive frame indicated by a line 74. At this point of time, the optical modems 12 and 14 are still equal peers. Optical modem 14 is first to properly receive a transmission packet, which packet is processed by examining the preamble, the control words, the data format and the timing. Since no start-up decisions have previously been made, the control words in the transmitted packets from optical modem 12 will indicate its peer status, which is equal Optical modem 14 will set up in the slave mode and assert the digital carrier detect (DCD) bit in its control word. The optical modem 14 receives the first transmitted packet in a receive frame 76 and subsequently transmits a packet of information with the asserted DCD bit.

Since the optical modem 14 is now in the slave mode, it will enable its DPLL 64 and align the data edges received in the transmitted packet from the optical modem 12. The DPLL 64 of the optical modem 14 will compensate the phase drift resulting from the differance in crystal frequencies of the two optical modems 12 and 14. The time average system clock frequency of the optical modem 14 will now equal that of the optical modem 12.

After receiving the transmitted packet at the optical modem 14, a transmitted packet of data is assembled and transmitted at the initiation of the transmit frame 78, at a point 80. This transmission is represented by an arrow 82 which, as described above, has a propagation delay associated therewith. Initially, prior to determination of the master/slave status, the variable receive time frame 84 at the optical modem 12 is set to an initial maximum value of thirty-one in the machine cycle of the optical modem 12. Since this variable receive time is at maximum value, it can be seen that the first portion of the transmitted packet from frame 78 in optical modem 14 arrives prior to the beginning of a receive frame 86 in the optical modem 12. This arrival is represented by a point 88. The point 88 occurs during the variable receive time frame 84 due to the propagation delay in the fiber 10 and because the variable receive time frame 84 is at its maximum time. Of course, the variable receive time frame 84, represented by the ST11 state in the protocol of FIG. 3, must be of sufficient duration to account for maximum delay.

Since point 88 occurs prior to the initiation of the receive frame 86 in optical modem 12, the optical modem 12 cannot process the transmitted packet from optical modem 14. At the next transmitted packet from optical modem 12, transmitted during transmit frame 90, and represented by arrow 91, no recognition can be given by modem 12 to receiving data from the optical modem 14 and, therefore, optical modem 14 receives the transmitted packet generated in transmit frame 90, which transmit packet does not contain an indication that the optical modem 12 had received the DCD bit during its receive frame 86. The optical modem 14 recognizes this indication as a lack of synchronization and then proceeds to increment the variable transmit time of ST6, represented by frame 92 and then decrements the variable receive time in frame 94 the total time period of frames 92 and 94 remaining constant. The effect of this is that the transmit frame 78 is moved in time relative to the receive frame 76. However, it should be noted that the overall length of the machine cycle has not changed. What is changed is merely the relative position of the transmit frame 78 in the machine cycle with respect to the receive frame 76. This process iterates until the transmitted packet from the transmit frame 78 of optical modem 14 arrives properly aligned with the receive frame 86 of optical modem 12. This state is represented in FIG. 4b. It can be seen that no adjustment of the variable receive time in frame 84 or the variable transmit time between the receive frame 86 and the transmit frame 90, as represented by the state ST6 of the protocol in FIG. 3, has changed in the optical modem 12, since the optical modem 12 is now designated as the master.

When the optical modem 12 receives the transmitted packet from the optical modem 14 and processes the information, optical modem 12 recognizes that optical modem 14 has asserted its DCD state in the control word. The optical modem 12 will then assume the master status of the link and assert its DCD bit. The next transmitted packet from the optical modem 12 to the optical modem 14 will contain its asserted DCD bit. Optical modem 14 will realize that optical modem 12 is now synchronous and it will terminate the start-up procedure and maintain the settings for the variable transmit and receive times in states ST6 and ST11.

Figure 5:
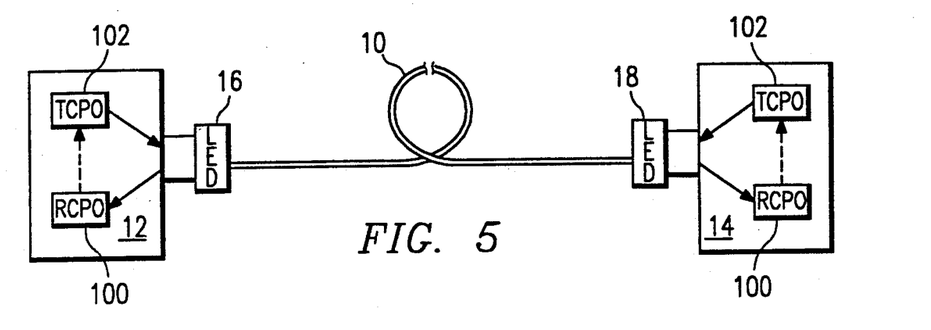
FIG. 5, illustrates a system block diagram of the transmit and receive oscillators and the operation thereof.

Referring now to FIG. 5, there is illustrated a schematic diagram of the internal oscillator section of the optical modem 12 and the optical modem 14. Each of the optical modems 12 and 14 have two crystal controlled clock generators on board, a receive clock, RCPO 100, and a transmit clock, TCPO 102. The clocks are divided by factors of five, six or seven from the frequency of crystal oscillator 47 (FIG. 2). A divide by six condition is a nominal condition. The divide by five or the divide by seven condition is controlled by the DPLL 64 to effect a phase adjustment. The RCPO 100 generates a two phase system clock. RCPO 100 is also the digital phase shifter of the DPLL 64 and therefore locks to the incoming data, as will be described hereinbelow. The TCPO 102 generates two phase clocks for the transmitter. Normally, the TCPO 102 is phase corrected by the DPLL 64. To prevent an unstable phase lock, the TPCO 102 of the master device is disabled from the DPLL 64 control. The DPLL 64 phase bump is quantized to the period of crystal oscillator 47 for approximately 1/6 of the normal system clock, as will be described hereinbelow.

During start-up, both the RCPO 100 and the TCPO 102 operate at the same frequency, which is divided by 1/6 of the crystal oscillator 47 frequency. The RCPO 100 begins to lock up onto a received packet, which in the start-up procedure indicates that the optical modem receiving the first packet is a slave. Once the slave optical modem locks onto the TCPO of the master optical modem, the start-up procedure and synchronization is initiated. In the above example, the optical modem 14 was the slave and the optical modem 12 was the master. Therefore, the RCPO 100 clock of the slave locks onto the TCPO 102 clock of the master and then transmits information out at the same frequency on the TCPO 102 of the slave. The TCPO 102 of the slave is in phase with the RCPO 100 of the slave. The RCPO 100 of the master then locks up to the TCPO 102 of the slave. Since the DCD bit is asserted in the transmitted packet in the slave, the TCPO 102 of the master operates independent of the RCPO 100 of the master. Otherwise, any attempt to lock onto the TCPO 102 of the slave by the RCPO 100 of the master may cause a phase perturbation in the TCPO 102 of the master. This could result in lock-up errors.

Figure 6:
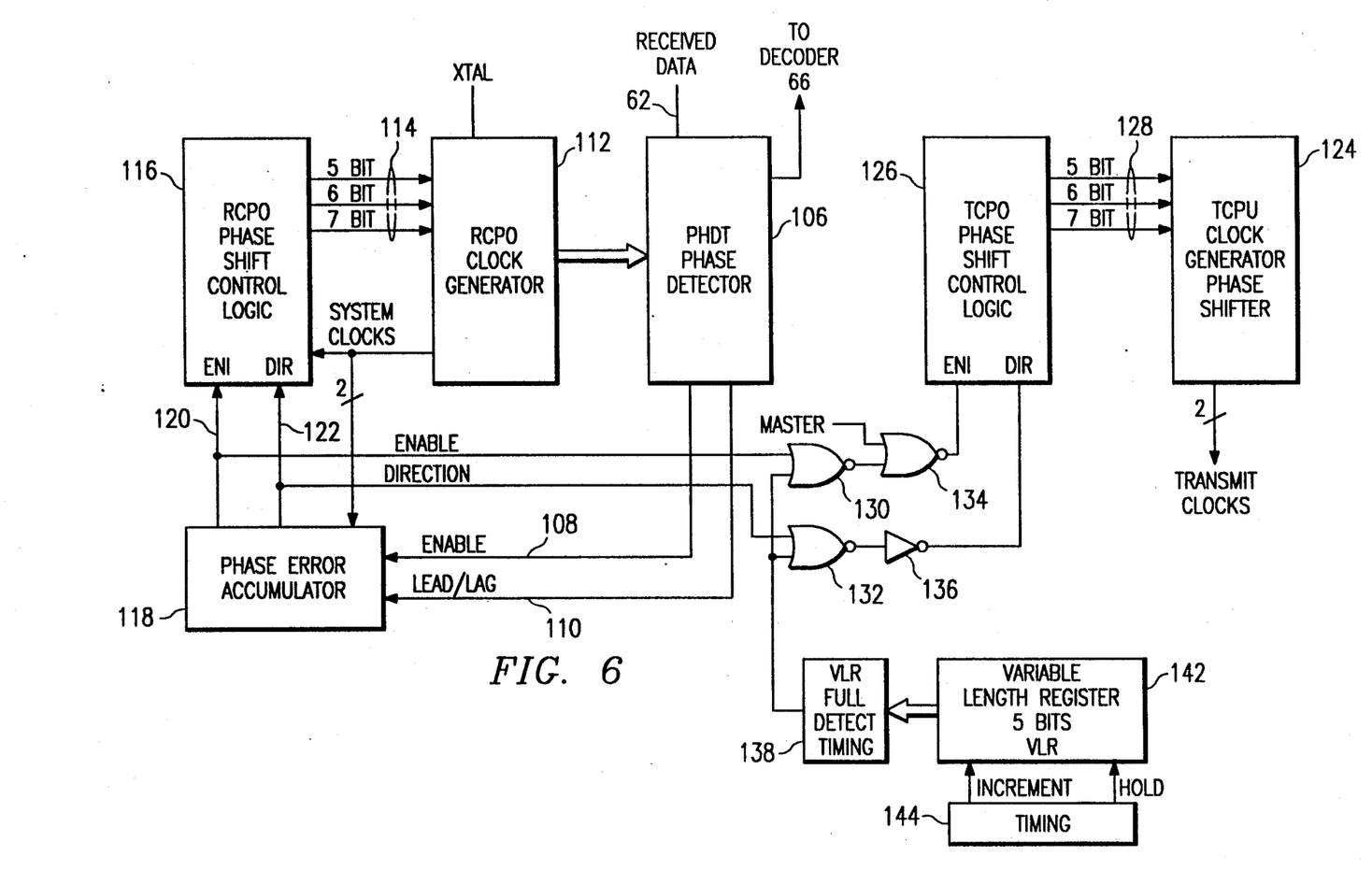
FIG. 6, illustrates a schematic block diagram of the transmit and receive oscillators for a single transceiver.

Referring now to FIG. 6, there is illustrated a schematic block diagram of the DPLL 64. The received data from the receiver 62 is input to a phase detector 106 that determines whether the phase of the received data is leading or lagging that of the RCPO clock 100. The phase detector 106 outputs the received data to the decoder 66 and also outputs an enable signal on line 108 and a lead/lag signal on a line 110. The lead/lag information represents the phase error. The phase detector 106 receives on the input thereof timing signals for phase alignment from an RCPO clock generator 112. The clock generator 112 is essentially a phase shifter which provides a divide by five, divide by six and divide by seven function. These control signals are received on line 114 from an RCPO phase shift control logic circuit 116. The enable signal line 108 and the lead/lag control line 110 are input to a phase error accumulator 118. Accumulator 118 is essentially an up/down (U/D) counter which builds up the phase error. The lines 108 and 110 provide the control signals to accumulate phase error for a leading or lagging system. The output of the accumulator 118 provides an enable signal ENI on a line 120 and a direction signal DIR on a line 122 to provide a closed loop.

In operation, whenever the accumulator of the U/D counter in the accumulator 118 counts up to an overflow or counts down to an underflow, this indicates a "bump" signal. The ENI signal being high indicates that there is an overflow and the DIR signal indicates whether it is a countup or a countdown operation, indicating whether the divide ratio should be 5-bit or 7-bit. Once the bump has occurred, the output of the control logic circuit 116 returns to the 6-bit value.

A TCPO clock generator 124 is provided which is identical to the RCPO clock generator 112. It is also controlled by a separate TCPO phase shift control logic circuit 126, which is identical to the control logic circuit 116 and outputs three control lines 128 to determine whether the divide ratio is five, six or seven, six being nominal. The TCPO clock generator 124 outputs the two phase transmit clocks to determine the phase of the transmitted packet of information that will be transmitted from the associated optical modem. The transmit clocks are nominally 180° out of phase with the receive clocks when they are synchronized. However, the two clocks can be phase independent, as will be described hereinbelow.

The ENI signal line 120 is input to one input of a two input NOR gate 130 and the DIR signal on line 122 is input to one input of a two input NOR gate 132. The output of the NOR gate 130 is input to one input of a two input NOR gate 134, the output of which provides the ENI input of the control logic circuit 126. The output of NOR gate 132 is input through an inverter 136 to the DIR input of the control logic circuit 126. The other input of the NOR gate 134 is connected to the master control signal output by the control and timing circuit 32 (FIG. 2). This input indicates that a master status exists and the signal is high and the associated optical modem as the master in the link. The other inputs of NOR gates 130 and 132 are connected to the output of a detect circuit 138, which will be described hereinbelow.

Whenever the master signal is low, indicating that the optical modem is either a slave or that the peer status is equal during synchronization, the ENI signal is input to both the control logic circuit 116 and the control logic circuit 126 and both are phase locked. In a similar manner, the DIR signal is also input to control logic circuit 126. Whenever the master signal is high, indicating a master status, the ENI signal will be forced low. Whenever the ENI signal is low, the divide ratio will always be six.

In certain instances, system synchronization will not have occurred during the thirty-one bit increment procedure of the variable receive and transmit time, as represented by states ST6 and ST11. As described above, the variable receive time in state ST11 is decremented and the variable transmit time in state ST6 is incremented. Once these have been decremented and incremented respectively, to their full range, the DPLL 64 of FIG. 6 is operable to bump the TCPO generator 124. A variable length register 142 is provided which is controlled by a timing circuit 144. The timing circuit 144 is responsive to the decrementing and incrementing of the variable receive time and the variable transmit time, respectively. An increment control signal and a hold control signal are output to the variable length register 142. The variable length register 142 is an up counter that is a 5-bit counter, counting from a value of zero up to overflow. The output of the counter is input to the detect circuit 138 which detects when a full count is present, indicating that the full 32 bits of count. At this point, detect circuit 138 recognizes that the variable receive time at a minimum value with the variable transit time is at a maximum value. A pulse is then output to the input side of the NOR gates 130 and 132. This input results in the ENI signal going high and the DIR signal going high to change the ENI and DIR inputs to logic high signals, thereby selecting the divide by 5 operation of the TCPO 124 for one cycle. Thereafter, the RCPO clock generator 112 continues seeking synchronization with the variable transmit time again at a minimum and the variable receive time again at a maximum.

Figure 7:
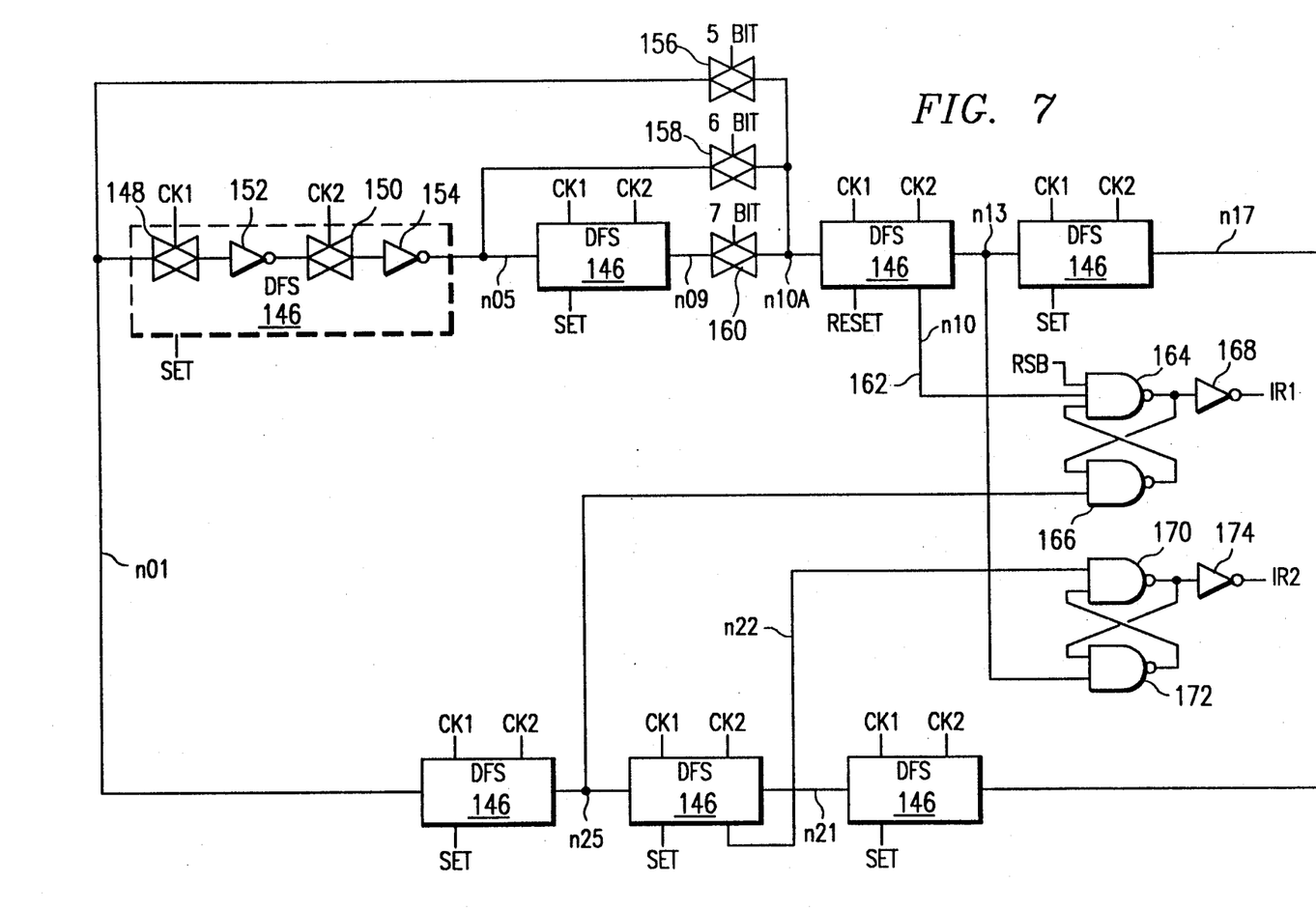
FIG. 7, illustrates a schematic block diagram of one of the transmit and receive oscillators.

Referring now to FIG. 7, there is illustrated a schematic block diagram of the clock generators 112 and 124. The clock generators 112 and 124 are comprised of seven data flop set circuits (DFS) 146. Each of the DFS circuits 146 are comprised of two switches 148 and 150 and two inverters 152 and 154. The switch 148 is an input switch which is connected between the input of DFS 146 and the input of inverter 152, and the switch 150 is connected between the output of inverter 152 and the input of inverter 154, the output of inverter 154 comprising the output of DFS 146. The clock signals CK1 and CK2 are connected to the control inputs of switches 148 and 150, respectively. The set input is provided for setting the DFS circuits 146 to predetermined states.

The DFS circuits 146 are connected in a ring fashion with signal nodes disposed therebetween. These nodes are labelled N10A, N10, N13, N17, N21, N22, N25, N01, N05, and N09 with no DFS circuit 146 disposed between nodes N09 and N10A. The DFS circuits 146 are configured in a ring to shift a zero therearound with all DFS circuits set to a "1" value with the except of DFS circuit 146 disposed between nodes N10 and N13, which is reset to a "0".

A switch 156 is connected between the node N01 and N10A to provide a bypass function between two DFS circuits 146 that are disposed between nodes N01 and N09 and which are controlled by a 5-bit control signal from the output of the associated logic circuit 116 or 126. In a similar manner, a switch 158 is connected between nodes N05 and node N10A to bypass the DFS circuit 146 between nodes N05 and N09, the switch 158 controlled by a 6-bit control signal. A switch 160 is connected between the nodes N09 and N10A, there being no DFS circuit 146 therebetween. In operation, only one of the switches 156, 158 or 160 are closed, indicating the divide ratio.

The DFS circuit 146 having the input thereof connected to the N10 node outputs on a line 162 a delay clock N10. The N10 clock is input to one input of a three input NAND gate 164, another input thereof connected to a reset signal RSB and another input thereof connected to the output of a two input NAND gate 166. The other input of NAND gate 166 is connected to the output of NAND gate 164, NAND gates 164 and 166 providing a an R/S latch operation. The other input of NAND gate 166 is connected to the N25 node. The output of NAND gate 164 is connected to the input of an inverter 168, the output of which provides a system clock signal IR1. The second clock signal IR2 is generated with the clock signals on nodes N13 and N21. The N21 node is connected to one input of a two input NAND gate 170, the other input of NAND gate 170 connected to the output of a two input NAND gate 172. The other input of NAND gate 172 is connected to the node N13 and the output thereof is connected to the other input of NAND gate 170. The output of NAND gate 170 is connected to the input of an inverter 174, the output of which provides the IR2 clock signal. The IR1 and IR2 clock signals provide nonoverlapping clocks.

Figure 8:
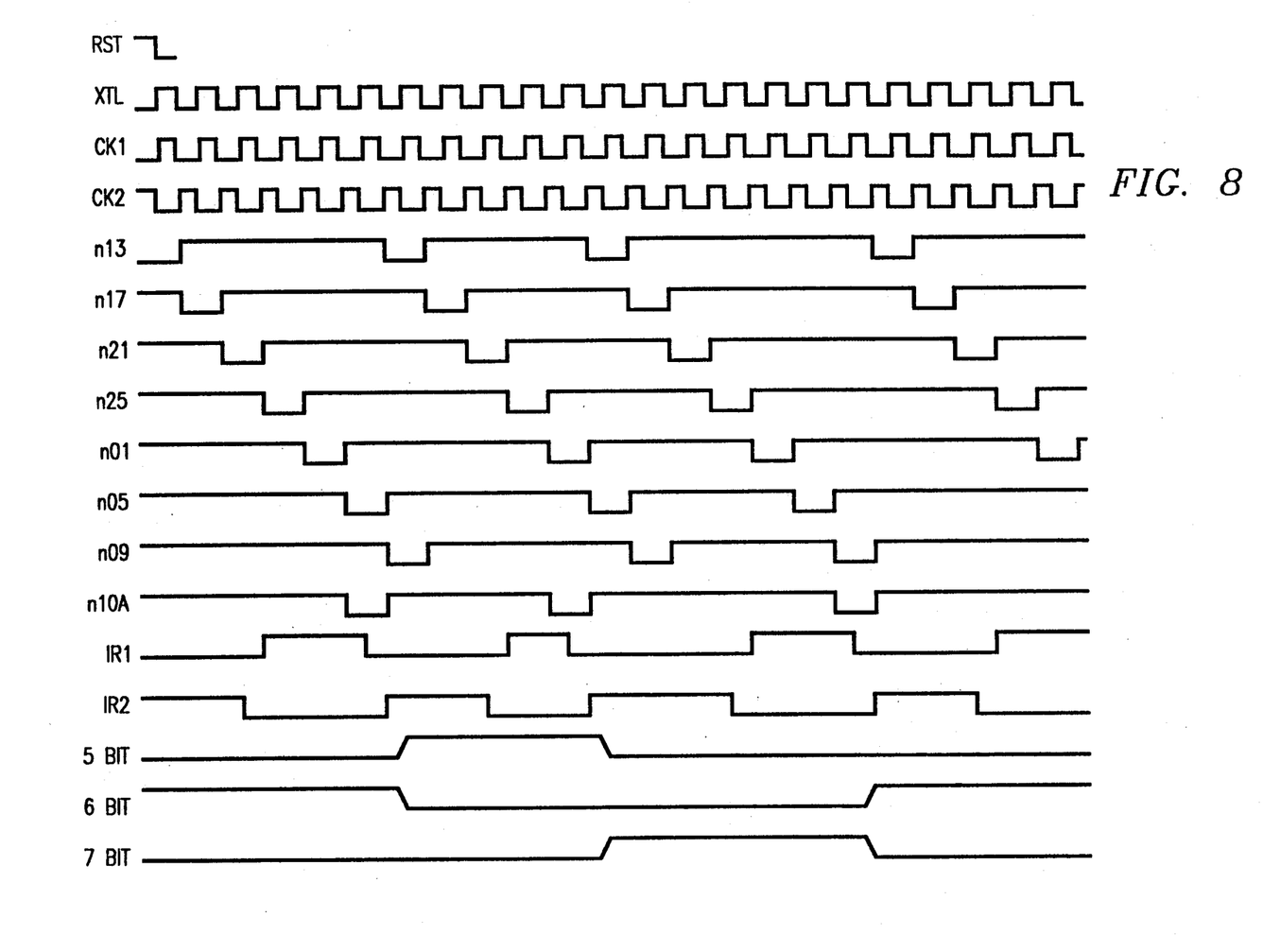
FIG. 8, illustrates a timing diagram for the transmit and receive oscillators.

Referring now to FIG. 8, there is illustrated a timing diagram for the system clocks. It can be seen that whenever the 5-bit control signal goes high, it goes high on a leading edge of the IR2 clock and stays high for one cycle, thus increasing the frequency thereof. The clock signal on the N10 changes the response thereto. In a similar manner, whenever the 7-bit control signal is asserted, the frequency of clock IR2 decreases, the 7-bit control signal being asserted for one period of the IR2 clock. The switches 156, 158 and 160 are therefore operable to insert a zero at a different time in the ring of DFS circuits 146.

Figure 9:
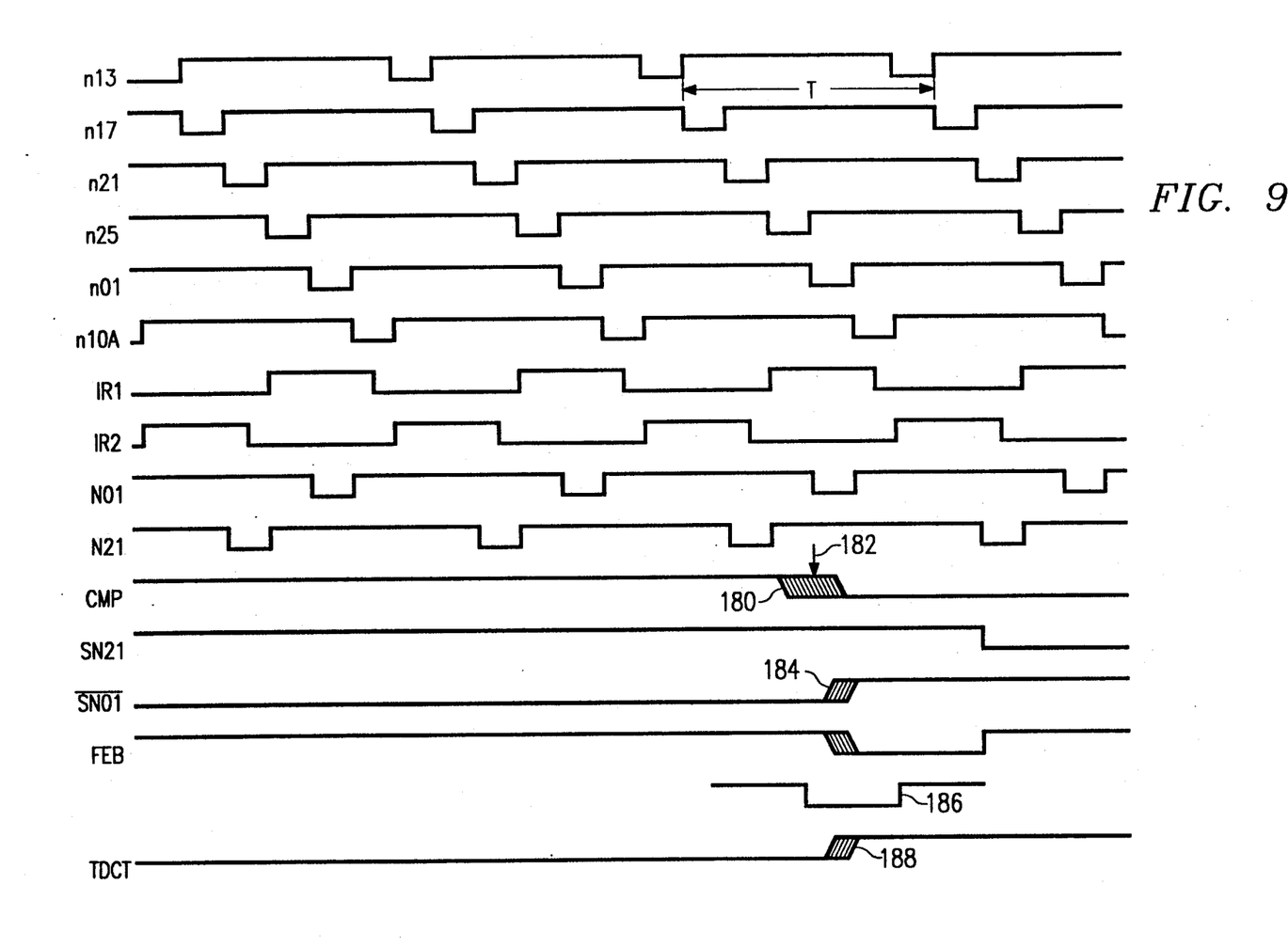
FIG. 9, illustrates a timing diagram for illustrating phase acquisition.

Referring now to FIG. 9, there is illustrated a timing diagram for illustrating the phase acquisition operation. A bit period is defined as being six periods of the crystal clock. Ideal DPLL phase alignment exists when the data transition occurs in the center of the bit period T. The data bit period and the system clock period are equal. Proper phase detection is quantized to the crystal clock period about the ideal alignment. Therefore, no phase error is detected for a data transition when it is within the two clock periods N25 and N01 about the ideal location. However, when the data transition occurs outside of the two clocks N25 and N01, this represents a leading or lagging situation. Data transitions that occur during clocks N10 and N13 indicate a leading system and data transitions that occur within clocks N17 and N21 indicate a lagging system. This will result in the generation of the lead/lag control signal output by the phase detector 106. This will control the phase error accumulator 118.

The increment of the variable time states is equal to one system clock period T. The variable received time or the variable transmit time are not adjusted until the slave optical modem is locked to the master optical modem, it being noted that both optical modems are peers until the synchronization is complete. Therefore, while the slave is adjusting the variable length registers, data transitions in consecutive transmit packets from the slave optical modem which are transmitted to the master optical modem arrived there with the same relative phase error to ideal alignment within the system bit period T of the master optical modem, but stepped in time by a full slave system clock period. Since the length of the optical fiber 10 is arbitrary, and therefore, the arrival of the slave transmit packet at the master optical modem is unknown, and assuming that the data edges of the slave transmitted packet can occur at the extreme ends of the bit period signals N17 on N13 in the master optical modem and, further, since the slave optical modem is slave to the transmit TCPO 102 of the master optical modem, the DPLL 64 of the slave optical modem will be tracking the master optical modem clock. In the worst case, the DPLL phase error cannot be accumulated until the phase drift is greater than the quantization unit of time, i.e. the crystal period. Therefore, the data edges of the transmitted packet of the slave modem may drift in and out, between clocks N10 and N13 (if the slave crystal is fast compared to the master crystal) or into the clock N17 of the next bit (if the slave crystal is slow relative to the master crystal). In this last case, the data transitions are drifting 180° out of phase into the next bit and data errors will occur. The master optical modem cannot process the proper transmitted packet from the slave optical modem, and this condition will not change because the slave optical modem is phase locked onto the master optical modem. The start-up procedure continues and the slave optical modem will increment through the full length of the variable time registers without receiving a DCD bit from the master optical modem. This failure is recognized by the slave optical modem when its variable length register is full, which will result in the slave optical modem resetting the variable time register to reiterate the process. However, the TCPO 102 of the slave optical modem will be phase bumped relative to the RCPO 100 therein. The direction of the TCPO phase bump is not relevant; what is important is that the data transition of the transmitted packet from the slave optical modem has been phase shifted and may occur closer to the ideal phase alignment of the master optical modem.

The instantaneous phase accumulation in the DPLL 64 of the slave optical modem is indeterminate with respect to the master optical modem and this condition can cause start-up errors. As an example, the data transitions for the transmitted packet from the slave optical modem may be just on the proper side of phase alignment, such that the master optical modem synchronizes on this data packet. However, the phase error accumulated in the DPLL of the slave optical modem is unknown. If the DPLL of the slave optical modem adjusts during its next receive frame in the direction to destroy the integrity of the phase alignment of the transmitted packet from the slave optical modem, the master optical modem receives this transmitted packet and data errors occur. To prevent this error, a strobed window of opportunity is provided for phase alignment, which window alleviates this problem. The strobe is centered around perfect phase alignment, its width minimized to the crystal period about perfect alignment and the window is only active during an optical modem start-up procedure. The first data transmission of the transmitted packet, i.e. the falling edge of the preamble, must occur within the strobe window. If not, an error flag is set to disallow synchronization. The strobe width is set by the worse case phase error around the system loop.

The data is illustrated in FIG. 9 by a waveform CMP. It can be seen that the falling edge of the preamble is illustrated by a group of potential phase transitions 180, which is centered about an ideal location 182. The ideal location 182 is aligned with the rising edge of the clock N25 and the falling edge of the clock N01. The CMP signal is sampled first by N21 to provide signal SN21, and then by N01 to provide SN01-bar. If CMP is sampled high during N21 and low during N01, then it can be determined that a falling edge of CMP has occurred between the end of sampling periods N21 and N01. Signal FEB goes low upon this condition. FEB is sampled during the receive preamble state ST1.

With the use of the strobe signal 186, the initiation of synchronization is effectively disabled until there is essentially phase alignment of the transmit packet from the master in the receive frame in the slave upon power-up of the system. In the synchronization process therefore, the clocks of the two optical modems would drift relative to each other until the leading edge of the transmit packet of the master occurred in the strobe window of the slave. This would only occur when the strobe window is centered about the leading edge of the transmit packet, i.e., essentially perfect phase alignment of the two operating cycles. This transmitted packet would be received, decoded, and a determination made as to whether a valid preamble, control words and data words were received. Once it is determined that a valid packet of information has been received, the optical modem receiving this packet will take on a slave status and assert its DCD bit. A transmit packet is then assembled with this asserted DCD bit and transmitted back to the other optical modem, which has not, as of yet, taken on a master status. Further, in the first operating cycle in which the first packet of information was received, no phase adjustment is attempted in the slave, since the DPLL is not enabled, the DPLL is enabled for the next received packet. If, in the next operating cycle, the slave optical modem does not receive a DCD bit in its received packet of information from the other optical modem, the slave knows that the other optical modem did not receive its previously transmitted packet of information with the asserted DCD bit. Therefore, the variable receive time and variable transmit time are then adjusted to adjust the relative position of the transmit frame in the operating cycle for the slave optical modem.

It should be noted that the RCPO 100 and the TCPO 102 in the slave optical modem are synchronized and that if any phase error is accumulated due to any drifting of the two crystals of the two optical modems, this is due to the fact that once slave status is indicated, the strobe window is removed and the phase error allowed to be accumulated. Thereafter, the RCPO 100 and TCPO 102 of the slave optical modem have the phase thereof adjusted to track the transmitted data from the other optical modem. In addition, during the synchronization procedure, the relative position of the transmit frame is adjusted in the operating cycle of the slave optical modem until it is received by the other optical modem, thereby designating it as a master, and a DCD bit from the master transmitted back to the slave optical modem. When the master receives its first packet of information, this is received at a relatively perfect phase alignment since it also has a strobe window. Once it receives the first packet of information from the slave, it recognizes that there is a DCD bit asserted and therefore designates the optical modem as a master. In this mode, there is no communication between the RCPO 100 and the TCPO 102 in the master, and they operate independently. However, on the first received packet, no adjustment is made either to the RCPO 100 or the TCPO 102 of the master since the DPLL is not enabled. After the first packet of information is received, subsequent receive packets of information from the slave may result in an accumulation of some phase error. This will result in an adjustment of the RCPO 100 in the master and the only relationship that the RCPO 100 of the master has with the TCPO 102 of the master is through the slave RCPO 100 and TCPO 102.

In an alternate feature of the present invention, one of the optical modems 12 and 14 can be set into a forced slave mode to hasten the start-up procedure. The optical modem in the forced slave mode has its transmitter section disabled in the initial stages of start-up. Therefore, this modem will be the first to receive a proper transmitted packet of information and therefore be set up as the slave. Phase drift in the forced slave unit is implemented by inserting an extra clock in its machine cycle until the proper transmitted packet is received. This is achieved by placing all of the DG1, DG2 and DG3 inputs to the logic "1".

Another feature of the invention are loop back modes, local and remote. Loop backs are supported in both asynchronous and synchronous modes, with either an internal or an external $T \times C$ clock. In the local loop back mode, the transmit data and clock (if applicable) inputs are looped back inside the near-end optical modem and output on the receive data and clock outputs. This allows the near-end user to verify performance up to the optical modem. Ping-pong synchronization between the optical modems is maintained. Data is still transmitted to the far-end optical modems. Inputs to the near-end receiver are not output at $R \times D$, and the DCD- signals high. Local loop back takes precedence over remote loop back.

When remote loop back is selected on the near-end of an optical modem, the near end optical modem directs the far-end optical modem to loop back its received data. This allows the user to verify performance of the complete near-end optical modem, the fiber, the LEDs and most of the far-end optical modem. The far-end optical modem also outputs receive data and clock (when applicable) at $R \times D$ and $R \times C$. When remote loop back is selected and synchronization is achieved, the DCD- signal goes low on the near end optical modem. When the remote loop back is in effect, the far-end optical modem ignores inputs to the $T \times C$ and $T \times D$ and brings DCD- high. Local loop back is selected with logic state "001" on the DG1-DG3 inputs and remote loop back is selected with a logic state "010" on the DG1-DG3 inputs.

In summary, an optical modem has been provided which operates in either a master or a slave mode on either end of a data link, which mode is determined in a start-up procedure. In the start-up procedure, data is transmitted in a ping-pong format and the first optical modem to receive a transmitted packet takes on a slave status. The slave optical modem then locks up to the received packet and transmits its own packet back to the data link and the other optical modem. The relative position of the transmitted packet from the slave optical modem is adjusted within this machine cycle to account for propagation delay through the data link. When proper adjustment of this position is made, the transmitted packet from the slave optical modem can be received at the opposite end of the optical fiber by the other optical modem. This transmit package contains information as to the slave status and, recognizing this, the other optical modem takes on the status of master. As acknowledgement of receipt of transmitted information from the slave is then transmitted from the master to the slave so that the slave knows that it has achieved synchronization. Thereafter, the start-up procedure is terminated.

Although the preferred embodiment has been described in detail, it should be understood that various changes, substitutions and alterations can be made therein without departing from the spirit and scope of the invention as defined by the appended claims.

What is claimed is:

1. A duplex transmission system for transmitting packets of data between two remote points and having a data link for carrying data therebetween, a first modem at one end for interfacing with transmitted and received packets of data and a second modem at the other end of the data link for interfacing with transmitted and received packets of data, each of the modems comprising:

a transmitter for receiving and encoding data to be transmitted as packets of data, and for transmitting the encoded packets of data during a transmit frame;

a receiver for receiving from the data link received packets of data during a receive frame and decoding the received packets of data;

control circuitry for generating operating cycles within said modem, the operating cycles sequentially generated and comprised of said transmit and receive frames;

a control decoder for decoding master/slave status signals from the received data during the receive frame and generating a master status signal if a slave status signal has been received and decoded, and for generating a slave status signal if no status signal has been received or if a master status signal has been decoded from the received data during the receive frame;

status encoding circuitry for encoding the master and slave status signals onto the transmitted packets of data in the transmitter when the transmitted packets of data are generated; and a phase lock loop for locking the transmitter operation and the receiver operation to the received packets of data when the slave status signal is not present in the received packets of data, said phase lock loop operable to lock the receiver only to the received packets of data when the slave status signal is present.

2. The transmission system of claim 1 and further comprising:

a first variable time circuit for generating a variable time between said transmit frame and said receive frame in said operating cycle;

a second variable time circuit for generating a variable time between said receive frame and said transmit frame; and control circuitry for controlling said first and second variable time circuits to vary the time relationship of said transmit frame and said receive frame relative to each other within said operating cycle when data has been received and no slave status signal has been decoded by said control decoder, said control circuitry adjusting said variable times until said control decoder contained therein decodes said received packet of data having a master status signal contained therein.

3. The transmission system of claim 1 wherein said transmitter includes a transmit clock generator and said receiver includes a receive clock generator and wherein said phase lock loop includes:

a phase error accumulator for determining the phase error between said receive clock generator and said received packet of data; and control circuitry for adjusting the phase of said receive clock generator to compensate for phase error;

said control circuitry for compensating the phase of said transmit clock generator to account for phase error between said transmit frame and said transmitted packet of data when a slave status signal is absent from the received data.

* * * * *